(12) United States Patent
Grauzinis et al.

(10) Patent No.: US 11,333,615 B2
(45) Date of Patent: May 17, 2022

(54) VEHICLE SURFACE SCANNING SYSTEM

(71) Applicant: VEHICLE SERVICE GROUP, LLC, Madison, IN (US)

(72) Inventors: Aivaras Grauzinis, Schilde (BE); Geert Willems, Hechtel-Eksel (BE); Richard Adelman, Newtown, PA (US); Robert Finkle, Scottsdale, AZ (US)

(73) Assignee: Vehicle Service Group, LLC, Madison, IN (US)

( * ) Notice: Subject to any disclaimer, the term of this patent is extended or adjusted under 35 U.S.C. 154(b) by 122 days.

(21) Appl. No.: 16/964,947

(22) PCT Filed: Jan. 25, 2019

(86) PCT No.: PCT/US2019/000003
§ 371 (c)(1),
(2) Date: Jul. 24, 2020

(87) PCT Pub. No.: WO2019/147390
PCT Pub. Date: Aug. 1, 2019

(65) Prior Publication Data
US 2021/0041371 A1 Feb. 11, 2021

Related U.S. Application Data

(60) Provisional application No. 62/709,723, filed on Jan. 26, 2018.

(51) Int. Cl.
*G01N 21/88* (2006.01)
*G01B 11/245* (2006.01)
(Continued)

(52) U.S. Cl.
CPC ....... *G01N 21/8806* (2013.01); *G01B 11/245* (2013.01); *G01B 11/2545* (2013.01);
(Continued)

(58) Field of Classification Search
CPC ................. G01B 11/25; G01B 11/24
(Continued)

(56) References Cited

U.S. PATENT DOCUMENTS 4,188,544 A 2/1980 Chasson
4,742,237 A * 5/1988 Ozawa ............... G01B 11/2527
250/559.08

(Continued)

FOREIGN PATENT DOCUMENTS

DE 202013000050 2/2013
DE 102014224274 6/2016
(Continued)

OTHER PUBLICATIONS

Huang et al., "Dynamic three-dimensional sensing for specular surface with monoscopic fringe reflectometry", Optics Express, Jun. 20, 2011, 19(13):12809-12814.
(Continued)

*Primary Examiner* — Shawn Decenzo
*Assistant Examiner* — Jarreas C Underwood
(74) *Attorney, Agent, or Firm* — Fish & Richardson P.C.

(57) ABSTRACT

An improved vehicle surface scanning system for assessing the damaged surfaces of a vehicle with resulting estimates of repair costs. A mobile scanning booth is assembled in an open-ended tunnel-like rig having a plurality of reflective panels positioned along opposite sides and across the roof of the booth to serve as deflection screens. A plurality of scanner modules are mounted in fixed positions about opposite ends of the booth and positioned to face the interior of the booth. Wheels provide controlled locomotion/movement of the scanning booth over the vehicle. The scanner modules use a combined hybrid methodology of active stereo 3D reconstruction and deflectometry to acquire data measurements along the surfaces of the vehicle incrementally as the
(Continued)

booth is moved. The incremental measurement data acquired during the mobile scanning is processed and furthermore combined to produce accurate reports of the damage surfaces and estimates of associated repair costs.

13 Claims, 8 Drawing Sheets

(51) Int. Cl.
  *G01B 11/25* (2006.01)
  *G01N 21/95* (2006.01)
(52) U.S. Cl.
  CPC .. *G01N 21/9515* (2013.01); *G01N 2021/8829* (2013.01); *G01N 2021/9518* (2013.01)
(58) Field of Classification Search
  USPC .......................................... 356/603–610, 611
  See application file for complete search history.

(56) References Cited

U.S. PATENT DOCUMENTS

| | | | |
|---|---|---|---|
| 5,530,551 A * | 6/1996 | Cantrall | G01N 33/362 356/394 |
| 6,147,752 A * | 11/2000 | Hewitt | G01N 21/8803 356/237.1 |
| 6,549,289 B1 * | 4/2003 | Ellis | A01K 11/006 348/135 |
| 6,556,783 B1 * | 4/2003 | Gelphman | H04N 5/232 396/20 |
| 7,532,333 B2 * | 5/2009 | Haeusler | G01B 11/2545 356/601 |
| 7,616,300 B2 | 11/2009 | Nohara et al. | |
| 8,064,069 B2 * | 11/2011 | Wienand | G01B 11/25 356/612 |
| 8,243,289 B2 | 8/2012 | Lin et al. | |
| 10,880,538 B2 * | 12/2020 | Tausch | H04N 13/243 |
| 2005/0238237 A1 * | 10/2005 | Haeusler | G01B 11/2545 382/203 |
| 2005/0254378 A1 | 11/2005 | Wagner et al. | |
| 2006/0192979 A1 | 8/2006 | Lammert et al. | |
| 2007/0146728 A1 * | 6/2007 | Pristner | B60S 5/00 356/612 |
| 2008/0137088 A1 | 6/2008 | Wagner | |
| 2008/0317334 A1 * | 12/2008 | Hausler | G01B 11/25 382/154 |
| 2009/0271068 A1 * | 10/2009 | Shi | G01V 5/0008 701/36 |
| 2010/0310130 A1 | 12/2010 | Beghuin et al. | |
| 2012/0300065 A1 | 11/2012 | Willemann et al. | |
| 2013/0057678 A1 * | 3/2013 | Prior Carrillo | G01N 21/8806 348/125 |
| 2014/0139717 A1 | 5/2014 | Short | |
| 2015/0219500 A1 | 8/2015 | Maes | |
| 2015/0324991 A1 | 11/2015 | Schmidt et al. | |
| 2017/0147990 A1 | 5/2017 | Franke et al. | |
| 2017/0148102 A1 * | 5/2017 | Franke | G06Q 30/0278 |
| 2019/0170507 A1 | 6/2019 | Grauzinis et al. | |
| 2021/0396684 A1 * | 12/2021 | Tissandier | G01N 21/9515 |

FOREIGN PATENT DOCUMENTS

| | | |
|---|---|---|
| DE | 102014224274 A1 | 6/2016 |
| DE | 102016006780 | 12/2017 |
| DE | 102016006780 A1 | 12/2017 |
| WO | 2015169730 A1 | 11/2015 |
| WO | WO 2015169730 | 11/2015 |

OTHER PUBLICATIONS

Konolige, "Projected Texture Stereo", 2010 IEEE International Conference on Robotics and Automation, May 3-8, 2010, Anchorage, Alaska, USA, 148-155.
PCT International Preliminary Report on Patentability in International Appln. No. PCT/US2017/000003, dated Jul. 28, 2020, 6 pages.
PCT International Preliminary Report on Patentability in International Appln. No. PCT/US2017/000043, dated Jan. 29, 2019, 6 pages.
PCT International Search Report and Written Opinion in International Appln. No. PCT/US2017/000003, dated Apr. 19, 2019, 8 pages.
PCT International Search Report and Written Opinion in International Appln. No. PCT/US2017/000043, dated Feb. 1, 2018, 7 pages, dated Oct. 2, 2017.
Ren et al., ""Absolute height measurement of specular surfaces with modified active fringe reflection deflectometry"", Conference Paper in Proceedings of SPIE the International Society for Optical Engineering, Aug. 2014, 9204:920408, 8 pages.
Rocchini et al., "A low cost 3D scanner based on structured light", Computer Graphics Forum, Nov. 2001, 20(3):299-308.
Zheng et al., "Structured Light Based 3D Reconstruction Using Gray Code and Line-Shift Stripes," Advanced Materials Research, May 11, 2010, 108-111(1):799-804.
Extended European Search Report in European Appln. No. 19743320. 4, dated Nov. 24, 2020, 7 pages.

* cited by examiner

VEHICLE SURFACE SCANNING SYSTEM

CROSS-REFERENCE TO RELATED APPLICATIONS

This application is a National Phase Application under 35 U.S.C. § 371 and claims the benefit of International Application No. PCT/US2019/000003, filed Jan. 25, 2019, titled "Vehicle Surface Scanning System," which claims the benefit of U.S. Provisional Application Ser. No. 62/709,723 filed Jan. 26, 2018, titled "Vehicle Surface Scanning System," and is related to International Application No. PCT/US2017/000043, filed Jul. 27, 2017. The contents of the foregoing applications are hereby incorporated by reference in their entirety as if fully set forth herein.

TECHNICAL FIELD

The present invention relates to optical scanning and imaging systems used to provide precise measurements of three-dimensional (3D) surfaces of the surfaces of an article under inspection and more particularly, to an improved vehicle surface scanning system comprising a mobile scanning booth specially assembled and equipped with a plurality of optical scanner modules that employ active stereo 3D reconstruction and deflectometry techniques to acquire incremental surface measurement data from a vehicle stationed in the booth in order to assess damaged surfaces of the vehicle and produce repair cost estimates based thereon.

BACKGROUND OF THE INVENTION

Accurately identifying and measuring dents, deformations and other imperfections made upon the damaged surfaces of vehicles, particularly those caused by hail storm impacts and collisions with other objects, is a meaningful undertaking in the automotive and aerospace industry in order to assess the cost of repairs and the extent to which insurance coverage is available to do so. Unfortunately, this task of identification and measurement of these surface deformations has been generally problematic because of the curved contours of those surfaces in a normal state and even more so because of the specular and glossy nature of the surfaces most typically found on those vehicles that present a challenging problem due to reflective nature of those surfaces. Typical metrology systems in this field of 3-dimensional surface inspection rely on measuring contrast of projected patterns on those targeted surfaces, but since most of these surfaces have both high curvature and high reflectivity, most of projected light is reflected away from camera, and produce very low contrast images of projected patterns. It is even more problematic when those above-described object surfaces are of dark colors and/or metallic paint type, where tiny metallic particles are suspended in a translucent coating. In such cases, there are three (3) defacto surfaces capable of reflecting projected light in very different and somewhat unpredictable ways, namely, the outer glossy and translucent layer, the suspended metallic particles, and the underlying color coat. Detection and resolution of all these differing reflections can be very complicated and prove to be compromising to the precision of the metrology system to the point where measurement errors becomes larger than the desired accuracy of measurement, especially in the areas of small defects, dents and scratches thereby making detection and reliable measurement of above mentioned articles either unreliable or impossible.

Prior art systems heretofore used in the detection and measurement of dents, deformations and scratches on specular, glossy and metallic surfaces have been either of the type employing active stereo or structured-light in order to scan and detect the object surfaces or have been systems employing deflectometry. 3D reconstruction systems can use a wide variety of methods including laser stripe projection, random pattern active stereo vision systems and structured-light digital pattern projection systems. To some extent, all of these systems have suffered in their effectiveness from the above mentioned reflectivity issues and produced low contrast images and noisy measurement results. Laser based systems suffer from the disadvantage of requiring moving parts and long acquisition times to measure large parts or surfaces. Stereo vision based systems are especially sensitive to reflectivity variations and produce least reliable results. Multiple pattern digital projection active stereo 3D reconstruction systems produce better results, but still have large measurement errors in areas of the above mentioned defects and therefore do not produce reliable enough results. Examples of these prior art active stereo 3D reconstruction systems for three-dimensional measurements are discussed and described in: C. Rocchini et al., "A low cost 3D scanner based on structured light", Computer Graphics Forum (Eurographics 2001 Conference Issue), 20(3): 299-308, 2001 and on the Internet at https://www.vs.inf.ethz.ch/edu/SS2005/DS/papers/projected/rocchini-3dscanner.pdf; Kurt Konolige, "Projected Texture Stereo", Willow Garage, Menlo Park, USA, published in Robotics and Automation (ICRA), 2010 IEEE International Conference on 3-7 May 2010; and Shun Yi Zheng et al., "Structured Light Based 3D Reconstruction Using Gray Code and Line-Shift Stripes", Advanced Materials Research (May 2010) 108-111:799-804. DOI: 10.4028/www.scientific.net/AMR.108-111.799.

Deflectometry systems work on different principles and exploit the reflectivity of the inspected object. Deflectometry typically uses a flat screen (LCD or similar) positioned towards the object in a way that a pattern displayed on the screen would be reflected by object to camera. This requires the screen to be few times larger than the intended measurement area and be completely flat to obtain good measurements. These requirements can pose serious limitations as the size of screens are limited and subject to tolerances on flatness and the spatial configuration of the deflectometry system often fails to be reasonable to measure large areas. Although deflectometry is capable of detecting local changes in curvature (such as dents and deformations) very well, due to ambiguities in the principle it is not capable of deriving absolute shape of the object with high accuracy, as this shape is extracted by assuming one can integrate the curvature information. Examples of prior art systems using reflectometry for 3D sensing and object measurements are discussed and described in the following publications: Lei Huang et al., "Dynamic three-dimensional sensing for specular surface with monoscopic fringe reflectometry", Optics Express 19(13):12809-14 (June 2011) DOI: 10.1364/OE.19.012809; Hongyu Rena et al., "Absolute height measurement of specular surfaces with modified active fringe reflection deflectometry", Conference Paper in Proceedings of SPIE The International Society for Optical Engineering 9204:920408 (August 2014) DOI: 10.1117/12.2060203.

SUMMARY OF THE INVENTION

The present system comprises a mobile scanning booth constructed and assembled in an open-ended tunnel-like rig having a plurality of reflection panels positioned along opposite sides and across the roof of the booth to serve as deflection screens. A plurality of scanner modules, each containing a primary ultra-wide digital projector, a secondary random pattern projector and a stereo pair of calibrated digital cameras, are mounted in fixed positions about the opposite ends of the booth and positioned to face the interior chamber of the booth wherein the vehicle is stationed for intended scanning. A set of wheeled assemblies each connected at the foot of a corner leg of the booth provides controlled locomotion/movement of the scanning booth over the vehicle, each wheeled assembly including a wheel pair coupled upon axial bearings and driven by a digital stepper motor linked to the wheels with a drive belt set upon reduction gear to provide increased torque. The scanner modules in conjunction with the deflection screen panels positioned along the booth use a combined hybrid methodology of active stereo 3D reconstruction and deflectometry to acquire data measurements along the surfaces of the vehicle incrementally as the booth is moved in a controlled fashion thereover. The incremental measurement data acquired during the mobile scanning is processed and furthermore combined to produce accurate reports of the damage surfaces and estimates of associated repair costs.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DESCRIPTION OF THE INVENTION

The following serves to describe a preferred embodiment and alternative variations of the present invention and the best presently contemplated mode of its production and practice. This description is further made for the purpose of illustrating the general principles of the invention but should not be taken in a limiting sense, the scope of the invention being best determined by reference to any associated claims.

Figure 1:
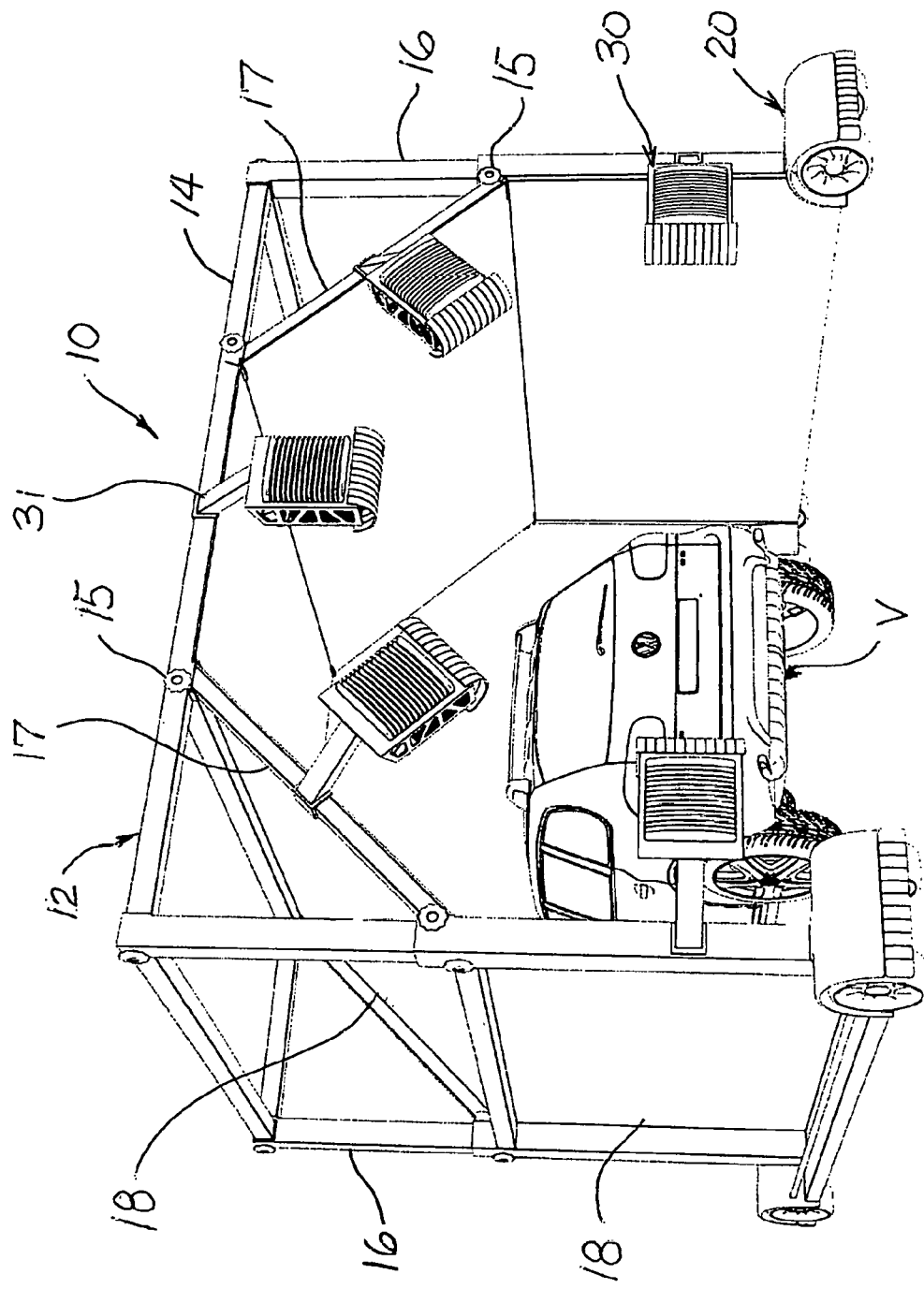
FIG. 1 is a side perspective view of a preferred embodiment of the vehicle surface scanning system deployed in operational position to scan a vehicle stationed therein.

Referring to the drawings, the following is a list of component elements of the present vehicle surface scanning system, generally designated 10 in FIG. 1 and those associated components employed in connection with the present invention:

10 vehicle surface scanning system;
12 mobile scanning booth;
14 tunnel-like rig;
15 rotational fasteners;
16 tubular frame members;
17 tubular frame segments;
18 deflection screen panels;
20 wheeled assemblies;
22 wheel pair;
23 axial bearings;
24 stepper motors;
25 drive belt;
26 reduction gear;
30 scanner modules;
31 articulated mounting arm;
32 digital camera stereo pair;
34 primary ultra-wide angle digital projector;
36 secondary random pattern digital projector;
38 module PC controller;
40 scanner module chassis;
42 tactile stop sensor;
V inspection vehicle;
$FV_C$ camera field of view
$FV_{P1}$ primary projector field of view
$FV_{P2}$ secondary projector field of view
$IR_A$ first inspection region
$IR_B$ second inspection region; and
$IR_O$ overlapping inspection region.

Figure 2:
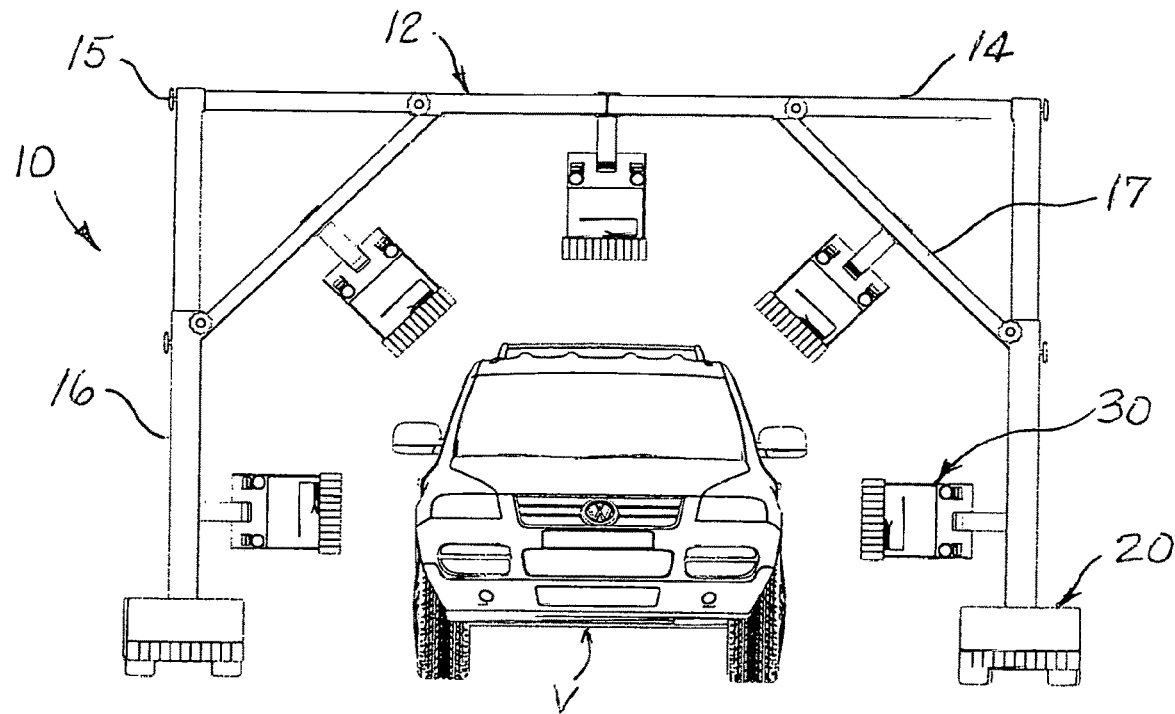
FIG. 2 is a vertical elevational view of the vehicle surface scanning system of FIG. 1 from the open end facing the rear of the vehicle stationed therein.
Figure 3:
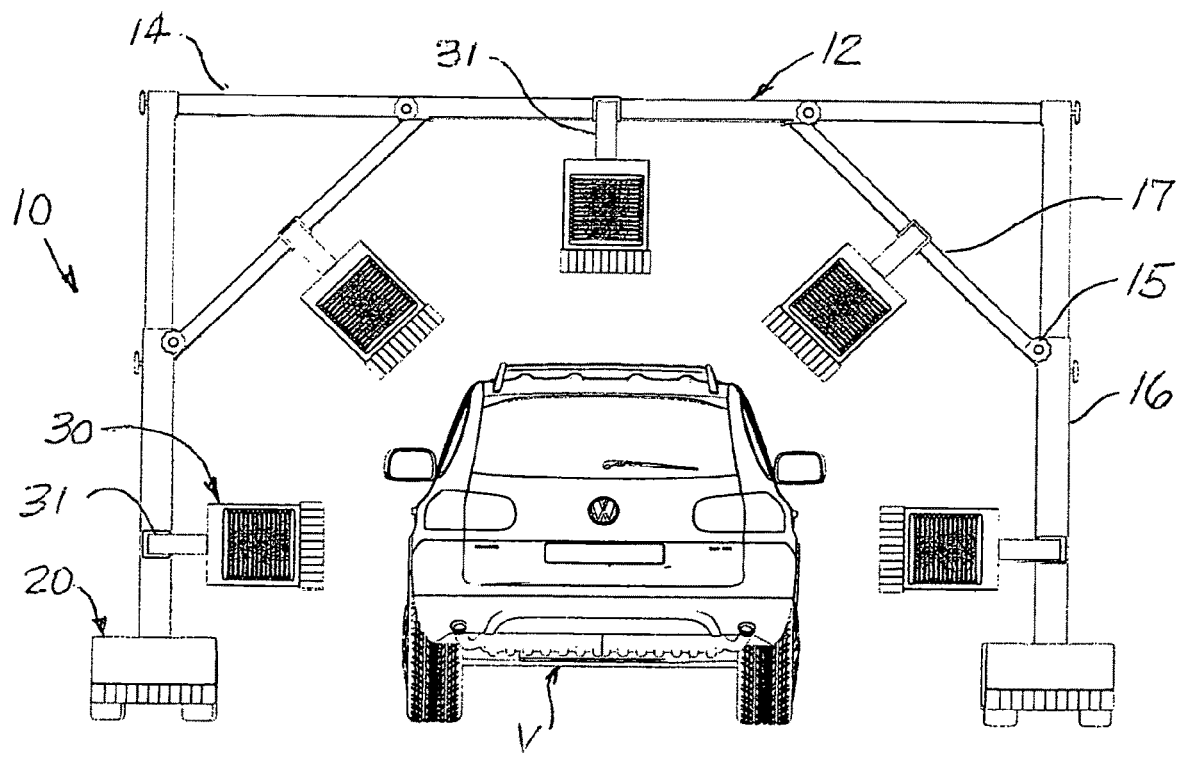
FIG. 3 is a further elevational view of the vehicle surface scanning system of FIG. 1 from the opposite open end facing the front of the vehicle stationed therein.

Referring now to FIGS. 1, 2 and 3, the present vehicle surface scanning system 10 is shown in a preferred embodiment for operational use in assessing the damaged surfaces of a vehicle V, such as surfaces damaged by hail storms, with capability of providing estimates of repair costs based on the assessed damages. The present vehicle surface scanning system 10 comprises a mobile scanning booth 12 constructed and formed from an open-ended tunnel-like rig structure 14. The rig structure 14 is generally a rigid, light weight construction made and assembled from a plurality of frame members 16 preferably made of aluminium or like material and formed having corresponding rectangular profiles. Main frame legs on the corners of the rig structure 14 are telescoping, allowing the roof of the rig to be raised into operational deployment and lowered to position where person can easily lift and mount parts and components. Assembly of the rig structure 14 requires mounting and fastening of longer frame members 16 along opposite sides of the rig between the main frame legs and further connecting shorter diagonal segments 17 between the roof and main frame legs that serve not only to brace them and further support the mounting of a plurality of scanner modules 30 as described in greater detail below. To secure the assembled rig structure 14 and join its component frame members 16 and segments 17 together, multiple screw-like rotational fasteners 15 are used at various junction points to effect the required connections. Adapted for inserted engagement of the respective frame members 16 and segments 17 at the various junction points throughout the rig structure 14, these rotational fasteners 15 are able to be manipulated by hand and provide for easy assembly and disassembly of the rig structure 14 without tools being required.

In accordance with the teachings of present applicants in International Application No. PCT/US2017/000043 regarding a hybrid 3D optical scanning technology that combines methodologies of active stereo 3D reconstruction and deflectometry and further as a means for implementing that technology in the present vehicle surface scanning system 10, the rig structure 14 of the mobile scanning booth 12 is designed to form a deflectometry tunnel incorporating a plurality of deflection screen panels 18, five (5) in number shown in the preferred embodiment, arranged together and positioned at 45 degree angles to each other, forming a segmented semi-circular surface for non-planar deflectometry. The deflection screen panels 18 are substantially flat and rectangular in form and are sized and shaped to fit in place within the frame members 16 along opposite sides and across the roof of the rig structure 14. In this implementation of the present vehicle surface scanning system 10, the deflection screen panels 18 are completely opaque, with internal surfaces coated for optimal reflection properties. Coating could be either specialized adhesive film, or fabric, or paint with all of those having specific reflection properties designed to minimize ambient light influence, reduce glaring or "hot-spot" effect and optimizing reflection angle lobe. The deflection screen panels may be made of a hard foam material or constructed in a sandwich panel structurally strong enough to maintain flat surface, while being light enough for easy assembly.

Figure 4:
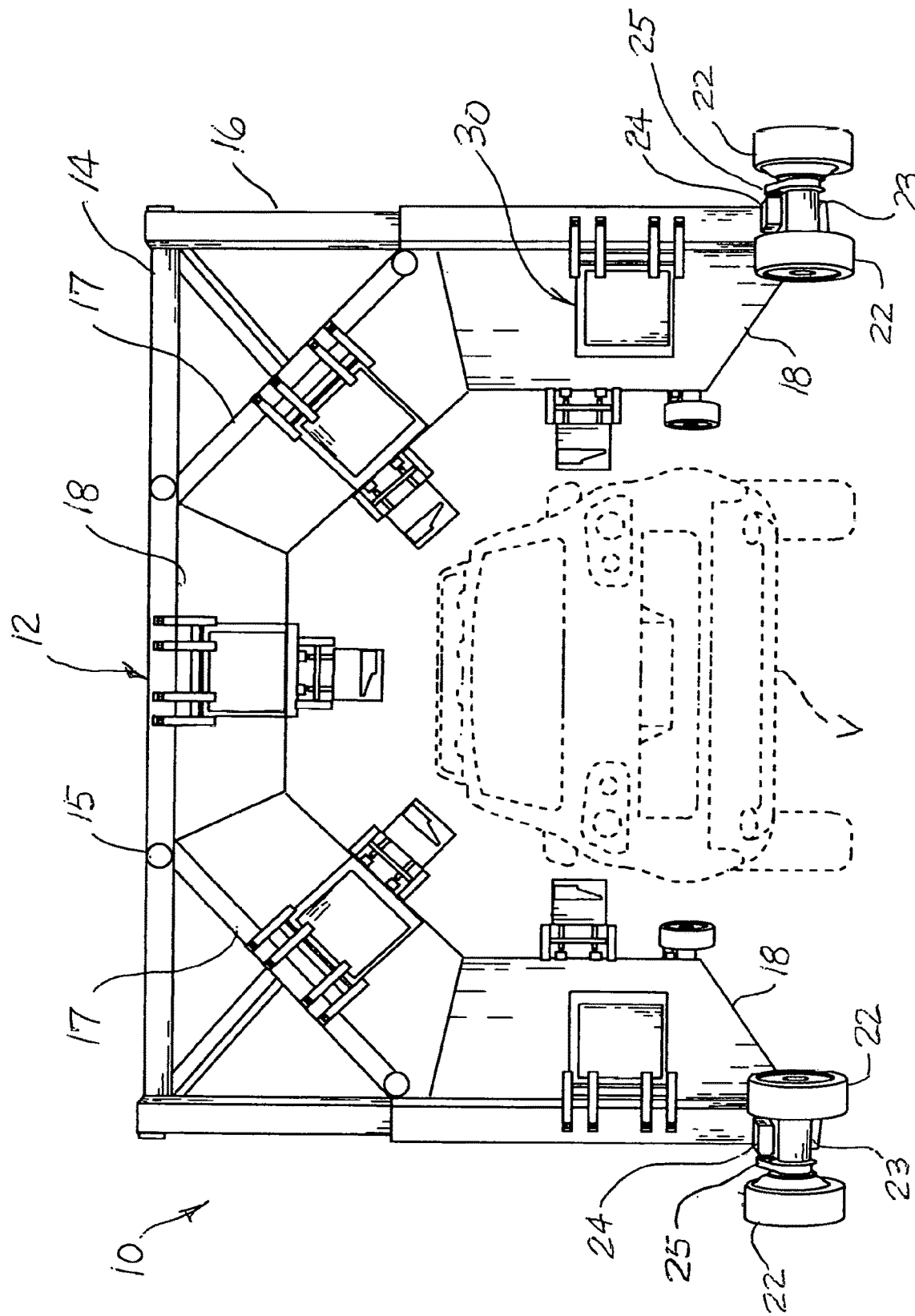
FIG. 4 is an additional elevational view of the present vehicle surface scanning system with wheel coverings removed and the vehicle therein shown in phantom outline.

Referring now to FIG. 4 in conjunction with FIGS. 1-3, a set of motorized wheeled assemblies 20 each assembled and operatively coupled at the foot of a respective corner leg of the tunnel rig structure 14 provides controlled locomotion/ movement of the scanning booth 12 over the vehicle V under inspection. Each wheeled assembly 20 includes a wheel pair 22 coupled upon axial bearings 23 and driven by a digital stepper motor 24 linked to the wheels with a drive belt 25 set upon reduction gear 26 to provide increased torque and stability to the rotation. Locomotion is thus provided and may be controlled via a PC platform. The digital stepper motors 24 are connected to the wheels 22 via reduction gear or reduction belt transmission. This implementation allows for very high accuracy control over the motion—distance of the motion is set by giving instruction to perform specific amount of incremental rotation steps, and speed and acceleration is controlled by setting frequency profile for incremental rotation steps—starting frequency and target frequency as the scanning profile for linear or sinusoidal frequency increases and/or decreases. The stepper motors 24 equipped with reduction gear transmission further provides excellent holding torque, which is important in effecting breaking and holding the rig structure 14 still. These digital stepper motors 24 are in contrast to standard electrical motors in that they do not rotate continuously, but rather make incremental angular steps, each step being precise and unchanging value. In the present preferred embodiment of the vehicle surface scanning system 10, it is found that the digital stepper motors 24 are making incremental steps of 1.8° so that a full axis rotation will require 200 steps from the motor. Therefore, with known reduction and wheel radius, it is possible to calculate exact amount of motion each step corresponds to, and by extension control in very precise calculations, the extent of linear motion of the rig structure 14 is determinable and subject to control. It is possible not only to set exact amount of steps for the stepper motor 24 to make, but also the frequency of these steps as well as a change of frequency in gradual matter, therefore ensuring very smooth start and stop of the rig 14 as well as precisely controlled motion speed. All this is important for structural reasons, minimizing if not eliminating, jerky and/ or other rig compromising motions, as well as for data processing for different vehicles where motion could be adjusted for specific vehicle type as well as known travelled distance to improve with integration of incrementally acquired scan data.

Figure 5:
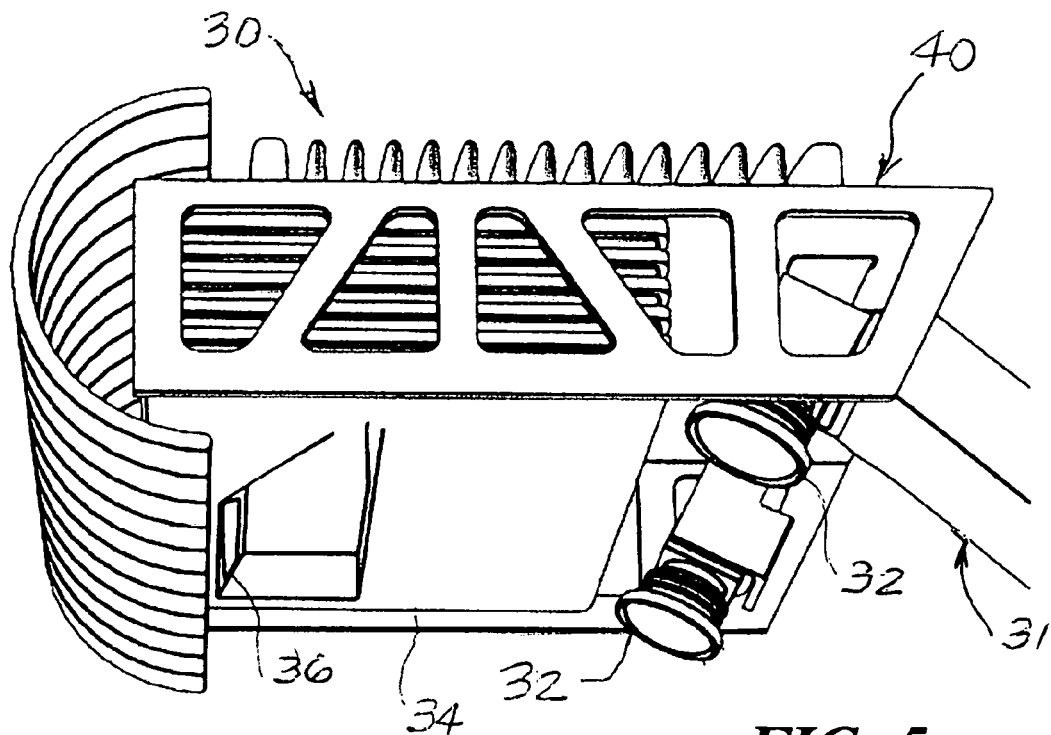
FIG. 5 is a perspective illustration of one of the scanner modules employed on the vehicle surface scanning system in accordance with the present invention.
Figure 6:
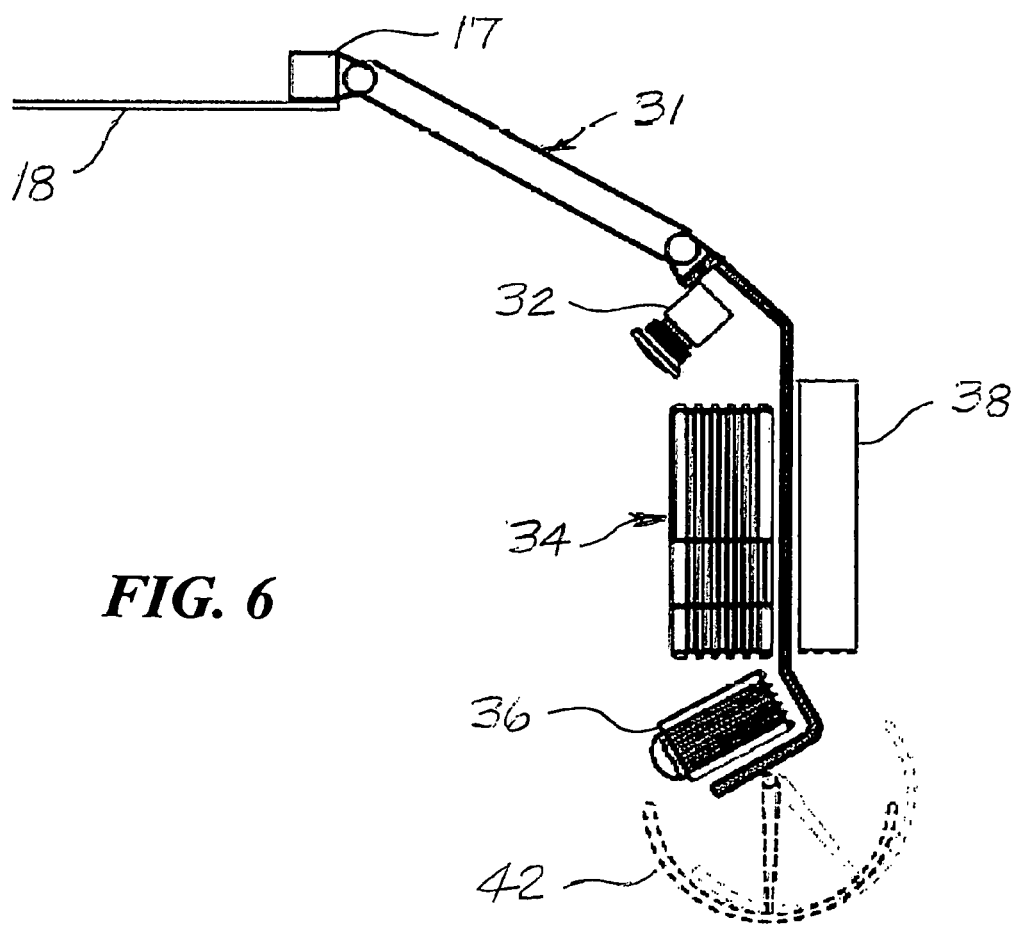
FIG. 6 is a schematic illustration of a typical articulated mounting of a scanner module upon the present vehicle surface scanning system.

Referring now to FIGS. 4 and 5 in conjunction with FIGS. 1-3, the present vehicle surface scanning system 10 further comprises a plurality of scanner modules 30, ten (10) in number shown in the preferred embodiment, each separately mounted in place upon the rig structure 14 about the opposite ends of the scanning booth 12. The scanner modules are fixed in their mounted positions and are directed to face the interior chamber from opposite ends of the booth 12 wherein the vehicle V under inspection is stationed for intended scanning. Each scanner module 30 contains a primary ultra-wide digital projector 34, a secondary random pattern projector 36 and a stereo pair of calibrated digital cameras 32 that are calibrated and controlled to operate in conjunction with the deflection screen panels 18 mounted about the tunnel rig 14 and surrounding the vehicle V to combine hybrid methodologies of active stereo 3D reconstruction and deflectometry for the acquisition of data measurements incrementally along the surfaces of the vehicle as the scanning booth 12 is moved in a controlled fashion over the vehicle.

In the present embodiment, the primary digital projectors 34 incorporated and used in the scanner modules 30 have a very wide angle projection lens, allowing each unit to project a very large image at very short distances. These ultra-wide projectors 34, also known as "short-throw projectors", are rigged into the scanner modules 30 and used to keep the projections from interfering with the reflections from the deflection screens 18. With the projection characteristics of the ultra-wide angle projectors 34, a larger number of these projectors is needed to effectively cover the full vehicle scanning area.

Together with the stereo camera pair 32 and the secondary random pattern projector 36, the primary digital projector 34 is contained and mounted to a common module chassis 40 on each scanner module 30. The respective scanner modules 30 along with an optional module control PC 38 for each are hung in fixed positions around the rig structure 14, generally placed in the middle of each tunnel segment 17 on an articulated mounting arm 31 with each of the scanner modules being directed so that the primary projector 34 is oriented to project towards the adjacent deflection screen 18, while the camera pairs 32 and secondary projector 36 are oriented towards the inspection vehicle V. An optional tactile emergency or proximity stop sensor 42 may be further provided at the base of each scanner module and its associated common chassis 40.

It should be noted that the ultra-wide angle primary projectors 34 could be accommodated and equipped with flapping mirrors, this way using the same projector for deflectometry and direct random pattern projection. That eliminates need for multiple type projectors, reduces complexity of whole projection system, as well as eliminates black light interference from the scanning operations.

Figure 7:
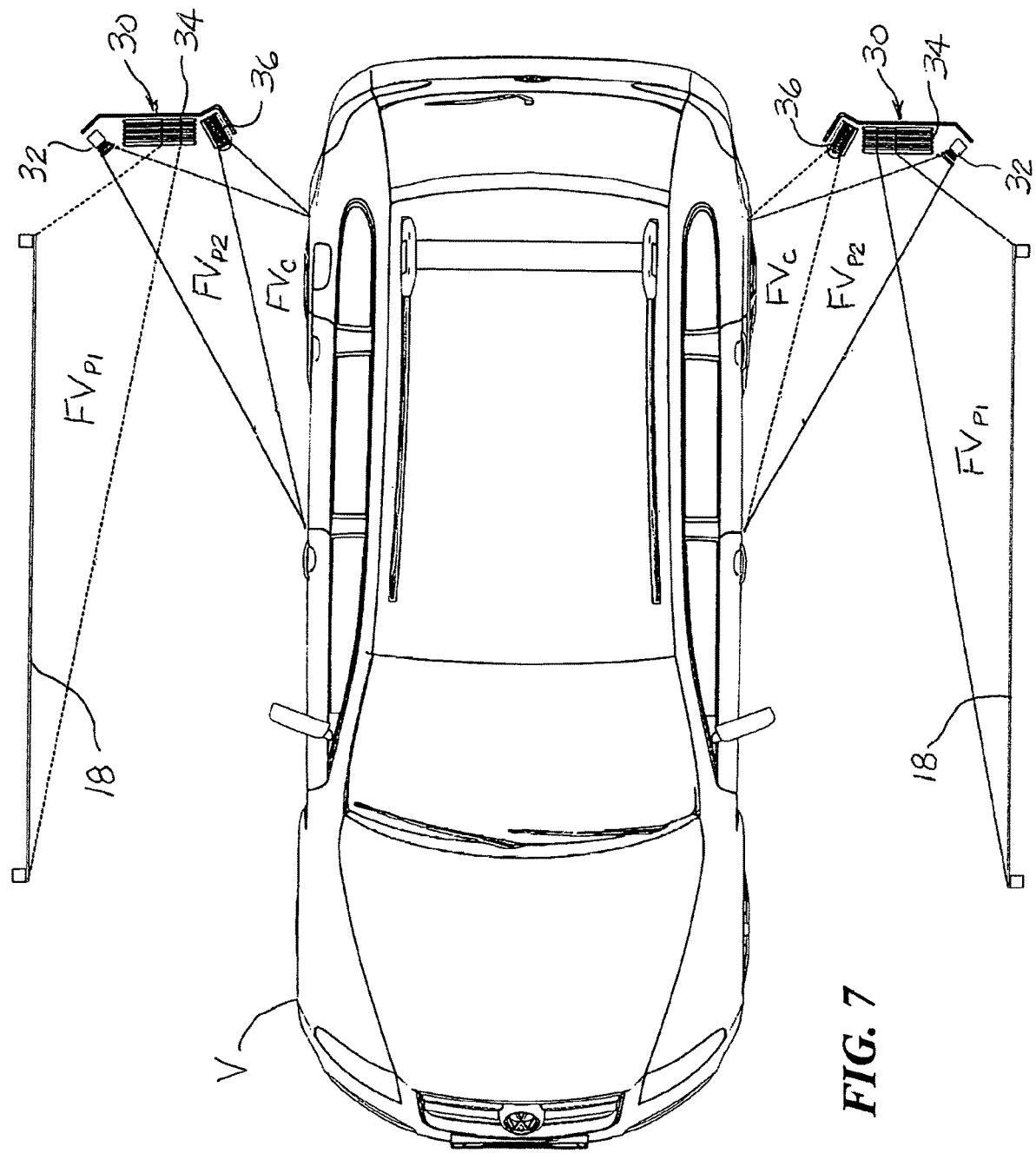
FIG. 7 is a schematic illustration from overhead of the respective fields of view of the scanner modules relative to the vehicle surfaces and the deflection screen panels associated with the present invention.
Figure 8A:
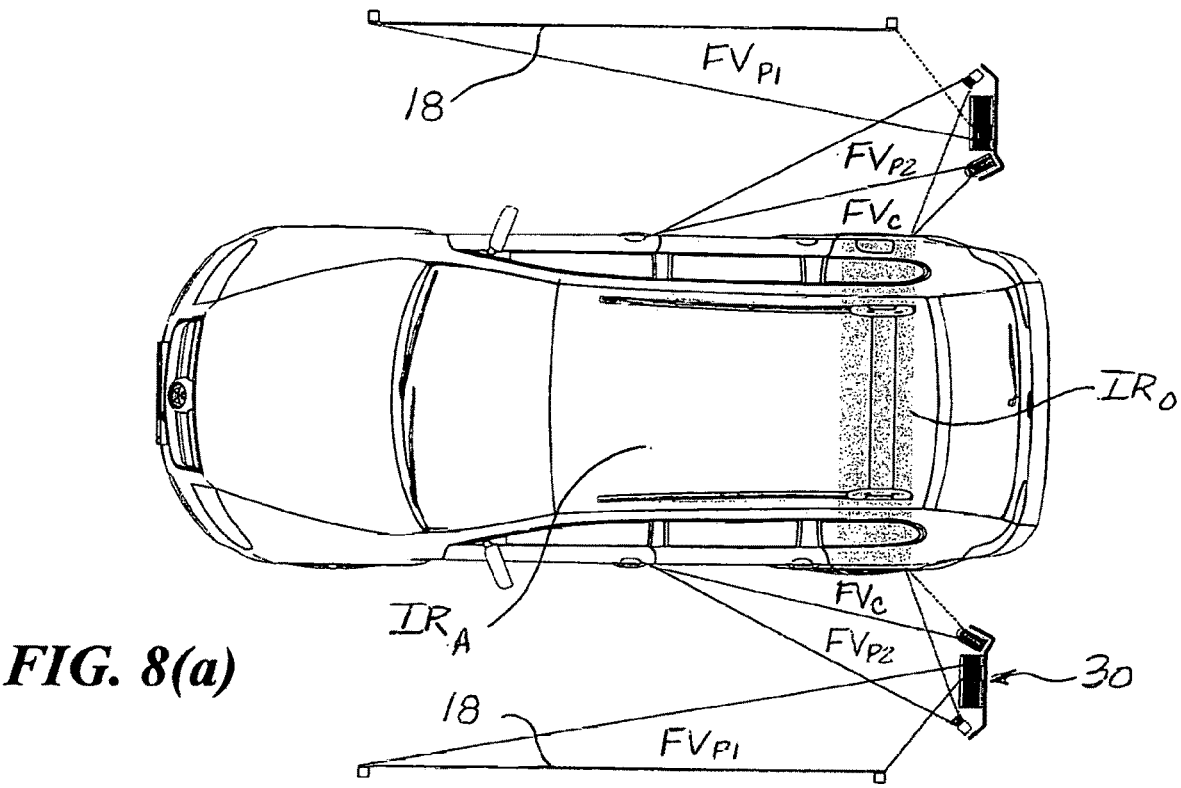
FIGS. 8(a)-8(b) are separate overhead schematic illustrations showing the respective surface inspection regions of the scanner modules effected along the vehicle during locomotion of the present vehicle surface scanning system.
Figure 8B:
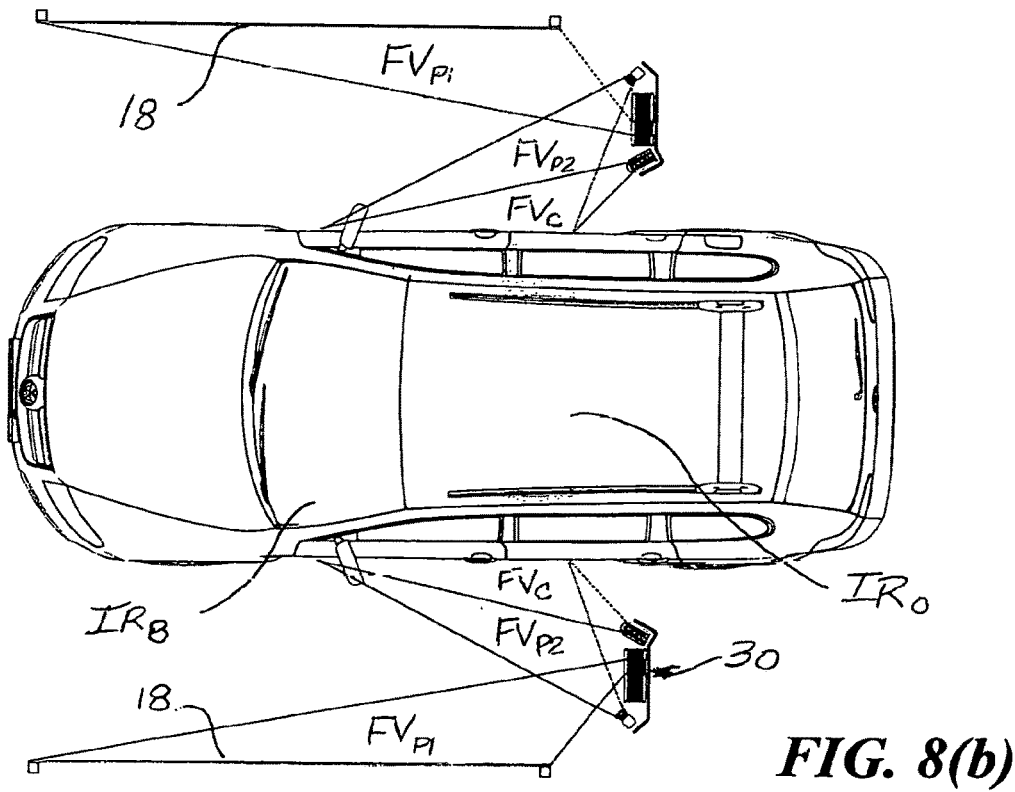

Referring now to FIGS. 7, 8(a) and 8(b) with respect to the operation of the inventive vehicle surface scanning system 10, to achieve high resolution and accuracy, the present system scans and inspects narrow slices of the vehicle V at a time, with the scanner modules 30 moving incrementally over the vehicle while the primary and secondary projectors cast their separate light patterns onto the deflection screen panels 18 and the vehicle surface regions, respectively, in their associated fields of view, $FV_{P1}$ and $FV_{P2}$. At the same time, the stereo camera pair 32 is capturing images from the region of the vehicle surface within its field of view $FV_C$, those of the random patterns projected by the secondary projector 36 and those deflectometry images from the primary projector 34. To inspect full vehicle V, the scanning booth 12 and associated rig structure 14 is moved incrementally, and scans are repeated. As seen in FIG. 8(a), once a first scan segment data is acquired in a first inspection region $IR_A$, rig motion control systems repositions the system along the vehicle V for the next scan over a second region $IR_B$, moving predefined distance to provide a sufficient segment overlap $IR_O$ for unambiguous final full vehicle reconstruction. It should be noted that variation of implementation can have scanner modules 30 placed at both ends of the tunnel, providing for larger inspection segment and therefore faster overall acquisition of data, as well as simplifying process of inspecting both front and rear parts of the vehicle V.

It should be further noted that the overlap of inspection segments $IR_O$ could be increased and act as double-redundancy inspection and verification to increase accuracy and robustness of the system. Alternatively, it could be reduced to bear minimum to increase acquisition speed and final segment registration and global reconstruction would rely mostly on motion control provided data on accurate displacement between each scan segments.

Figure 9:
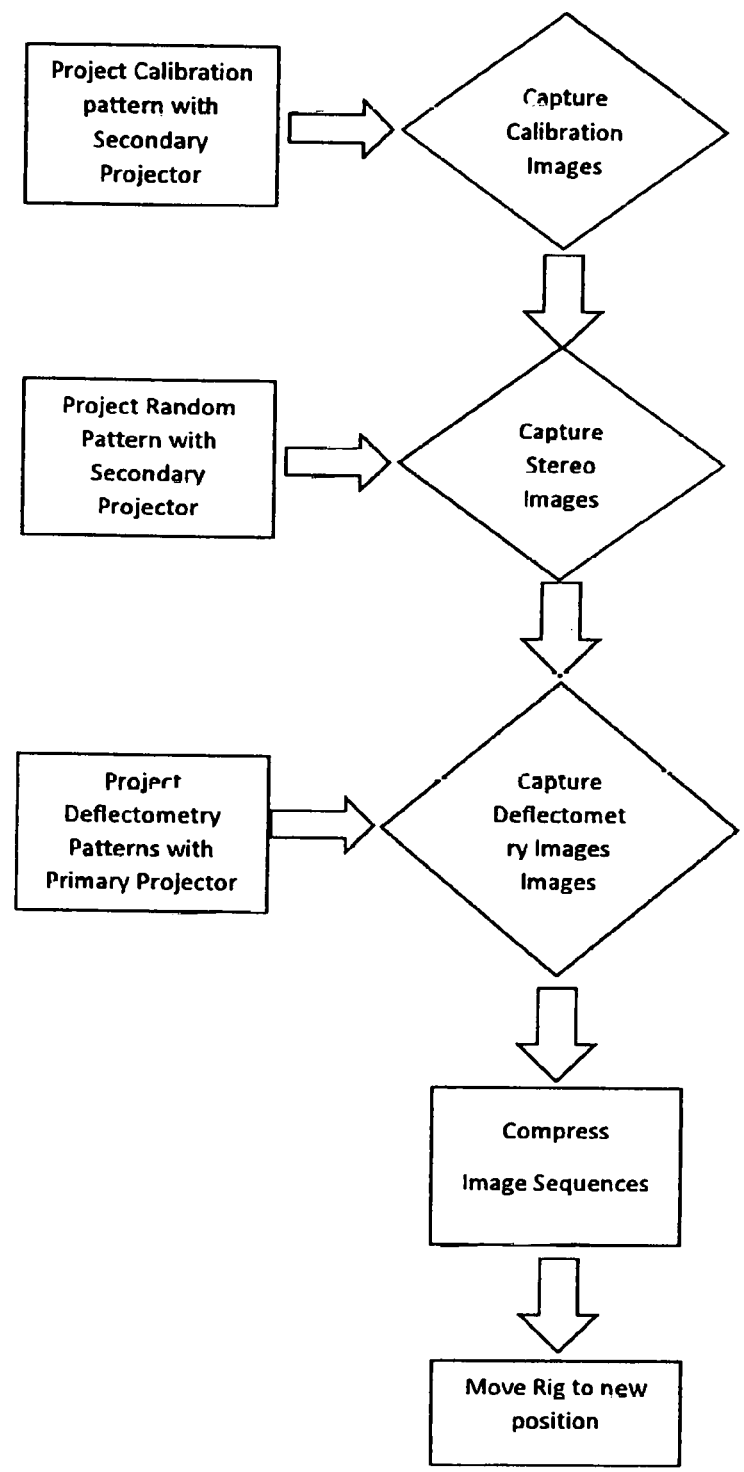
FIG. 9 is a data acquisition flow chart for the present vehicle surface scanning system.
Figure 10:
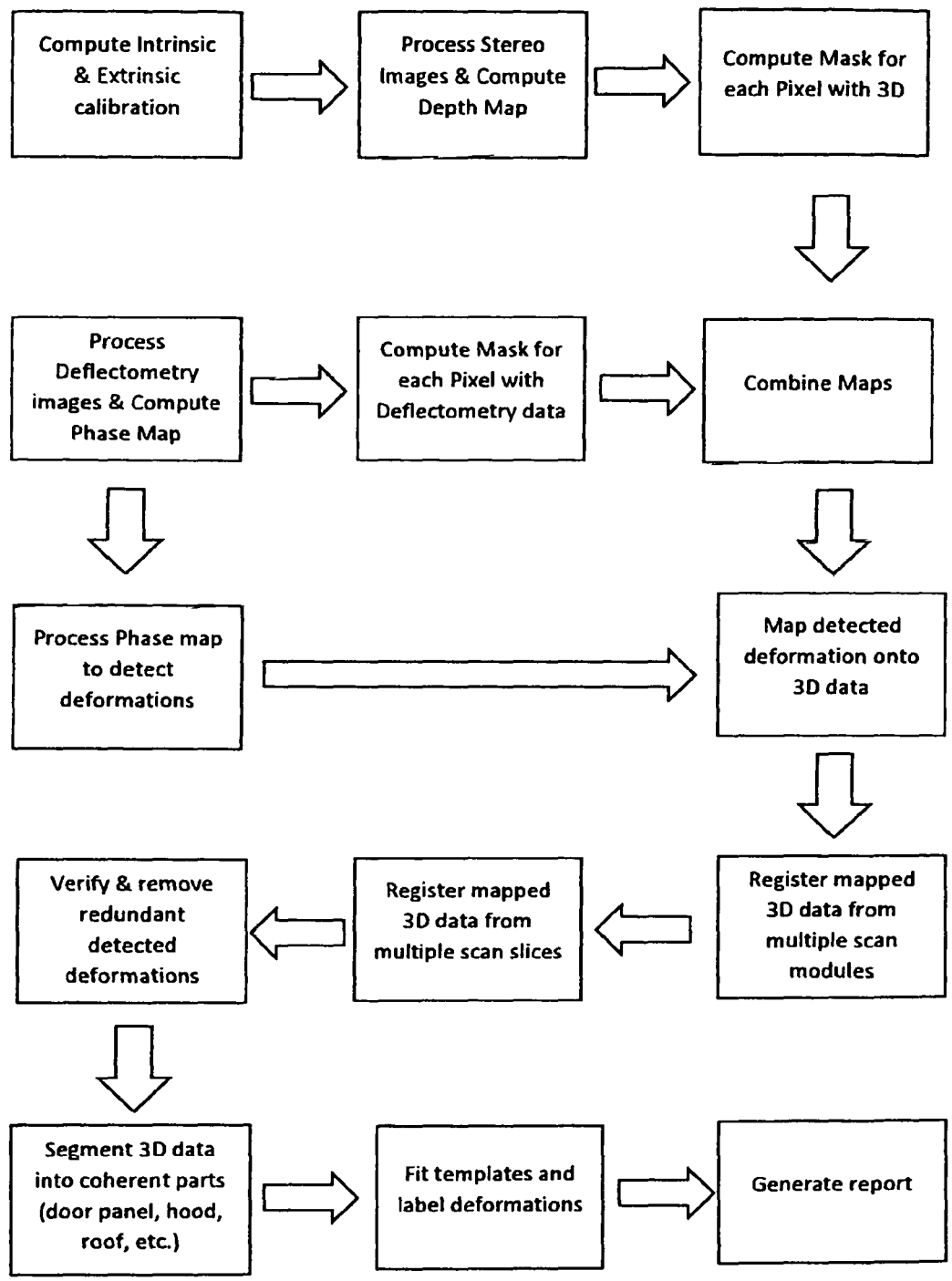
FIG. 10 is a processing flow chart for the present vehicle surface scanning system.

As shown in FIGS. 9 and 10, the incremental measurement data acquired during the mobile scanning is processed in accordance with the present invention and furthermore combined to produce accurate reports of the damage surfaces and estimates of associated repair costs.

Therefore, it is apparent that the described invention provides an improved vehicle surface scanning system fully integrated to provide accurate and reliable 3D surface measurements across the damaged surfaces of an entire vehicle in order to assess all of surface damage affecting the vehicle. More particularly, the present vehicle surface scanning system fully integrates a highly refined 3D optical scanner, mobile scanner booth, and associated electro-mechanical controls governed by a microprocessor computer to read, identify and display the count, shape and size of dents and other deformations in, along and across the entire surfaces of a damaged by hail storm or other impacts and further generate a complete and accurate assessment of the damages caused. The present invention is able to acquire and collect accurate 3D surface measurement data from the damaged surfaces of an automotive or aerospace vehicle in a controlled and continuous fashion and further based on the measurement data provide an estimated cost for repair of the damaged surfaces. In its fully integrated form, the present invention provides a reliable and accurate system for conducting a complete damage assessment of all exterior surfaces of a vehicle with images of the damaged surfaces and a report reflective of the cost to repair being generated therefrom. In addition, the present vehicle surface scanning system, as described, is cost effective to manufacture, easy to assemble and transport, and readily set up for operation.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Furthermore, certain modifications to the described embodiment that serve to benefit its usage are within the scope of the present invention. For example, a simple worm gear with electric drive added to selected frame members 16 of the rig structure 14 could drive and control the telescopic action of the members and further assist and ease the rig assembly. Accordingly, it is understood that this invention is not limited to the particular embodiment described, but rather is intended to cover modifications within the spirit and scope of the present invention as expressed in any appended claims.

What is claimed is:

1. A vehicle surface scanning system for assessing damages affecting the surface of a vehicle, comprising:
   a scanning booth constructed in the form of a tunnel-like structure adapted for movement and having an interior chamber sized to cover the vehicle, said booth being assembled having a plurality of deflection screen panels deployed along opposite sides and across the top of the chamber for use in conducting non-planar deflectometry;
   locomotion means operatively connected to said scanning booth for providing controlled incremental movement of the booth longitudinally over the vehicle; and
   a plurality of scanner modules mounted in fixed positions around the chamber at opposite ends of said scanning booth and operatively directed inwardly of the chamber for conducting a combined hybrid methodology of active stereo 3D reconstruction and deflectometry in conjunction with the deflection screen panels to acquire incremental data measurements along the surfaces of the vehicle as the booth is moved over the vehicle.

2. A vehicle surface scanning system according to claim 1, further comprising:
   first data processing means operatively connected to said scanner modules for combining the incremental data measurements acquired thereby to provide a three-dimensional reconstruction of the damaged vehicle surfaces including measurements of dents, deformations and scratches thereon and the respective counts, sizes and shapes thereof.

3. A vehicle surface scanning system according to claim 2, further comprising:
   second data processing means operatively connected to said scanner modules to produce reports of the damaged vehicle surfaces and estimates of associated repair costs.

4. A vehicle surface scanning system according to claim 1, wherein said locomotion means comprises:
   a plurality of motorized wheel assemblies operatively connected to said scanning booth and digitally controlled for moving the scanning booth over the vehicle in predetermined incremental stages.

5. A vehicle surface scanning system according to claim 4, wherein each of said motorized wheel assemblies comprises:
   a set of wheels axially coupled together; and a digital stepper motor operatively connected to drive rotational movement of the wheels in predetermined incremental angular steps.

6. A vehicle surface scanning system according to claim 1, wherein the plurality of deflection screen panels are arranged together and positioned at substantially 45 degree angles to each other, forming a segmented semi-circular surface for non-planar deflectometry.

7. A vehicle surface scanning system according to claim 1, wherein each of said scanner modules comprise:
   a primary ultra-wide digital projector having a wide angle projection lens to project a large image at relatively short distances keeping the projections therefrom from interfering with reflections from the deflection screens;
   a secondary random pattern projector; and
   a stereo pair of digital cameras calibrated and controlled to operate in conjunction with the deflection screen panels mounted about the chamber of said scanning booth,
   whereby each of the scanner modules is directed so that the primary projector is directed to project towards an adjacent deflection screen while the camera pairs and secondary projector are oriented towards the vehicle under inspection.

8. A vehicle surface scanning system for providing an assessment of damages along the surfaces of a vehicle under inspection, comprising:
   a mobile scanning booth constructed in the form of a tunnel-like structure having an interior chamber sized to cover the vehicle, said booth being assembled having a plurality of deflection screen panels deployed along opposite sides and across the top of the chamber for use in conducting non-planar deflectometry;
   motorized means operatively connected to said mobile scanning booth for providing controlled movement of the booth longitudinally over the vehicle in incremental steps;
   a plurality of scanner modules operatively connected to said mobile scanning booth and positioned to face inwardly of the chamber for implementing a combined hybrid methodology of active stereo 3D reconstruction and deflectometry in conjunction with the deflection screen panels to acquire data measurements along the surfaces of the vehicle in incremental steps as the booth is moved over the vehicle; and
   first data processing means operatively connected to said scanner modules for combining the incremental data measurements acquired thereby to provide a three-dimensional reconstruction of the damaged vehicle surfaces including measurements of dents, deformations and scratches thereon and the respective counts, sizes and shapes thereof.

9. A vehicle surface scanning system according to claim 8, further comprising:
   second data processing means operatively connected to said scanner modules to produce reports of the damaged vehicle surfaces and estimates of associated repair costs.

10. A vehicle surface scanning system according to claim 8, wherein said motorized means comprises:
   a plurality of motorized wheel assemblies operatively connected to said scanning booth and digitally controlled for moving the scanning booth over the vehicle in predetermined incremental stages.

11. A vehicle surface scanning system according to claim 10, wherein each of said motorized wheel assemblies comprises:
   a set of wheels axially coupled together; and
   a digital stepper motor operatively connected to drive rotational movement of the wheels in predetermined incremental angular steps.

12. A vehicle surface scanning system according to claim 8, wherein each of said scanner modules comprises:
   a primary ultra-wide digital projector having a wide angle projection lens to project a large image at relatively short distances keeping the projections therefrom from interfering with reflections from the deflection screens;
   a secondary random pattern projector; and
   a stereo pair of digital cameras calibrated and controlled to operate in conjunction with the deflection screen panels mounted about the chamber of said scanning booth,
   whereby each of the scanner modules is directed so that the primary projector is directed to project towards an adjacent deflection screen while the camera pairs and secondary projector are oriented towards the vehicle under inspection.

13. A vehicle surface scanning system according to claim 8, wherein the plurality of deflection screen panels are arranged together and positioned at substantially 45 degree angles to each other, forming a segmented semi-circular surface for non-planar deflectometry.

* * * * *